Feb. 25, 1969     D. R. SABRE     3,429,143
UNIVERSAL JOINT

Filed Dec. 22, 1966

INVENTOR.
DANIEL SABRE
BY
ATTORNEY.

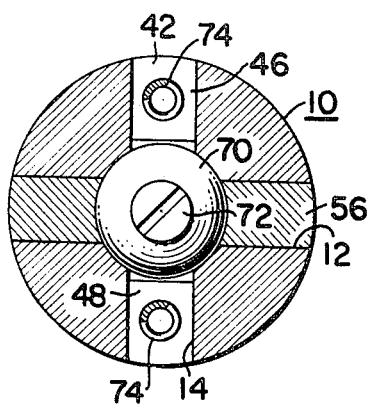
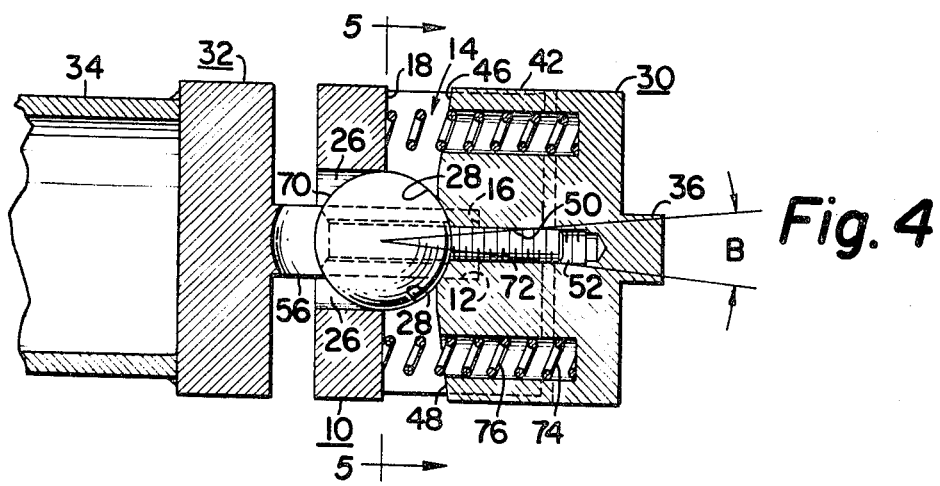

United States Patent Office 3,429,143
Patented Feb. 25, 1969

3,429,143
UNIVERSAL JOINT
Daniel R. Sabre, 560 Bryn Mawr Ave.,
Bryn Mawr, Pa. 19010
Filed Dec. 22, 1966, Ser. No. 603,816
U.S. Cl. 64—8                                   12 Claims
Int. Cl. F16d 3/22, 3/77

ABSTRACT OF THE DISCLOSURE

This invention relates to a universal joint particularly adapted for use in the drive of automobiles. In addition to providing for the usual universal type coupling, the universal joint disclosed herein is constructed to accommodate relative axial movement between the rear and the propeller shaft as the latter is moved rearwardly and forwardly from a normal drive position such as occurs under conditions of "wrap up" and "wrap down."

Cross-references to related applications

This application discloses a universal joint having certain elements in common with the universal joint disclosed in my copending application Ser. No. 507,612, filed Oct. 22, 1965, now Patent No. 3,304,878.

Background of the invention

The field of art to which the invention pertains is generally that of universal-type couplings. More specifically, the invention relates to universal joints particularly useful for the drive of an automobile, although obviously the invention will have broader application.

The universal joints of the prior art have not made adequate provision to accommodate relative axial movement between the coupled drive and driven members of the universal joint. Accordingly, in many applications, such as in the drive of an automobile, it is necessary to provide a spline or similar device in the drive train. This, of course, involves the necessity for an additional part and increases the cost of the mechanism. The universal joint in accordance with the invention avoids the necessity for a spline or similar device.

Summary of the invention

Briefly stated, the universal joint in accordance with the invention includes a pair of coupling members in driving engagement with an intermediate member, each of the coupling members being in engagement with the intermediate member for pivotal movement in confined paths perpendicular to each other. By this arrangement, a universal-type coupling is provided between the pair of coupling members. In addition, the mounting arrangement for one of the coupling members in engagement with the intermediate member is constructed to permit relative axial movement between this coupling member and the intermediate member with the driving engagement therebetween being maintained. Accordingly, the universal joint in accordance with the invention can accommodate relative axial movement of motion transmitting elements secured to the pair of coupling members in addition to providing for universal type coupling permitting deviation between the axes of the motion transmitting elements.

Brief description of the drawings

FIGURE 4 is an axial section of the universal joint shown in FIGURE 1 taken on a plane indicated at 4—4 of FIGURE 3; and FIGURE 5 is a section taken on line 5—5 of FIGURE 4.

Description of preferred embodiment

Figure 1:
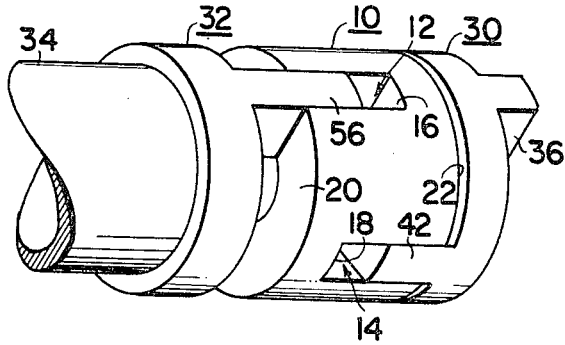
FIGURE 1 is a perspective view of a universal joint in accordance with the invention.
Figure 2:
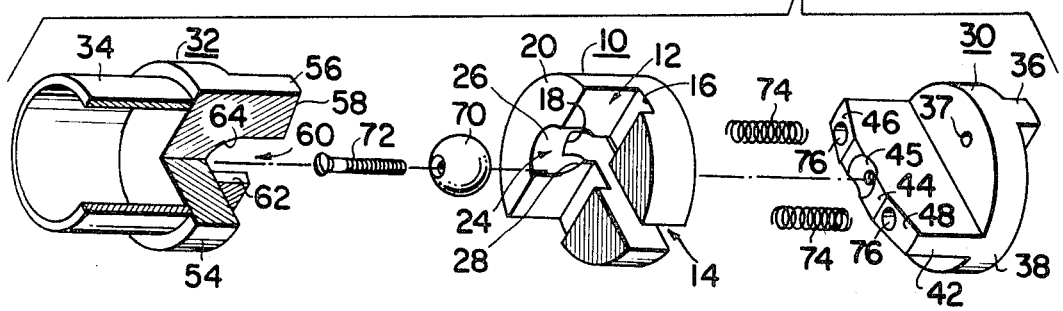
FIGURE 2 is an exploded view of the universal joint shown in FIGURE 1.

The universal joint shown in the drawings is adapted for use at the rear of the propeller shaft of an automobile and comprises a generally cylindrical member 10 provided with a pair of cavities or grooves 12 and 14 in the ends thereof. The grooves 12 and 14 are located to extend in planes perpendicular to one another and along a diameter of the cylindrical member 10 to provide open outer and side ends. The grooves 12 and 14 have opposed parallel sides and terminate at flat bottoms 16 and 18, respectively. The ends of member 10 are indicated at 20 and 22. Member 10 is also provided with an axial cavity indicated generally at 24 and extending inwardly from the end 20. The cavity 24 has a pair of spaced walls having a cylindrical portion 26 extending inwardly from end 20 and a hemispherical portion 28 at the innermost end thereof.

The universal joint comprises a pair of coupling members 30 and 32. The coupling member 32 is secured to an end of a shaft 34 and the coupling member 34 is provided with a projecting key-like member 36. In the application of the invention to the drive of an automobile, the shaft 34 is the propeller shaft of the automobile, with the coupling member 32 being secured to the rear end of this shaft, and the key member 36 will be drivingly engaged with the rear of the automobile. In this application, the coupling member 30 is provided with counterbored openings 37 adapted to receive bolts shown in dotted lines in FIGURE 3 for securing the coupling member 30 to the rear of the automobile. Accordingly, in the preferred embodiment shown in the drawing, coupling member 32 may be termed the drive member of the universal joint, the coupling member 30 may be termed the driven member and the member 10 may be termed the intermediate member.

Coupling member 30 comprises a cylindrical portion 38 and a flat sided extension 42 projecting axially and perpendicularly from the cylindrical portion 38. The outer end of the extension 42 is constructed with a central flat wall 44 and a pair of cut back or relieved walls 46 and 48 for a purpose which will become apparent hereafter. Coupling member 30 is provided with an axial bore 50 provided with a threaded portion 52 at its inner end.

The coupling member 32 comprises a cylindrical portion 54 and a flat sided extension 56 projecting axially and perpendicularly from the cylindrical portion 54. Extending inwardly from the outer end 58 of extension 56 is an axially extending socket 60 having a pair of partly cylindrical, opposed wall portions 62 adjacent the end 58 and a rounded portion 64 adjoining the wall portions 62.

In the assembled condition of the universal joint, the straight-sided extensions 42 and 56 are located within the straight-sided grooves 14 and 12, respectively. The fit of the extensions within the grooves is preferably a relatively tight fit to avoid lost motion. However, the fit must be such as to permit relative sliding movement between the opposed sides of the extensions and grooves. It will be noted that the relative sliding movement between extension 42 within groove 14 and extension 56 within groove 12 is limited to movement along the central planes of the grooves, which grooves are perpendicular to each other. Thus, coupling member 30 is confined to movement in a plane perpendicular to coupling member 32, which arrangement permits the universal-type coupling action.

Means are provided to hold the coupling member 30 and the intermediate member 10 together against relative axial movement and to provide a central point of articulation for the relative pivotal movement of the coupling members 30 and 32 in their confined planes. Such means comprises a spherical member or ball 70 adapted to be contained within the cavity 24 in intermediate member 10. The ball 70 is provided with an axial counterbored hole 71 for receiving a bolt 72 which extends from said hole into the bore 50 of coupling member 30. The bolt 72 is provided with a threaded portion adapted to engage the threaded portion 52 of the bore 50 as is shown in the assembled position of FIGURES 3 and 4 in which the head of the bolt 72 engages the shoulder of the counterbored hole 71. The ball 70 is assembled onto the coupling member 30 by threading the bolt into the hole 50 so as to place the ball 70 into contact with a spherical recess 45 formed on the end wall 44 of extension 42 and surrounding the end of bore 50.

By the assembly procedure discussed above, the ball 70 and the coupling member 30 are secured together for conjoint movement.

Means are provided for holding the assembly of ball 70 and coupling member 30 in a position wherein the ball 70 is in bearing contact with the spherical portion 28 of cavity 24. To this end, there is provided a pair of springs 74 received within bores 76 in extension 42. The bores 76 are placed on opposite sides of the axial bore 50 and the springs 74 are placed in compression between the flat bottom 18 of groove 14 in intermediate member 10 and the inner ends of the bores 76. Accordingly, the coupling member 30 is biased toward the right as viewed in the drawings so that ball 70 is in contact with spherical wall portions 28 of cavity 24 which limits the biased movement of the assembly of ball 70 and coupling member 30. As is best shown in FIGURE 4, in this biased position of the parts, the universal joint is constructed so that the end walls of extension 42 are spaced from the bottom wall 18 of groove 14. This is to permit a pivotal movement of coupling member 30 within groove 14 of intermediate member 10. Preferably, the parts will be designed so that taking into account the maximum amount of deviation possible in a particular application, there will be no contact between the various adjacent parts, i.e. the end of extension 42 and wall 18.

Figure 3:
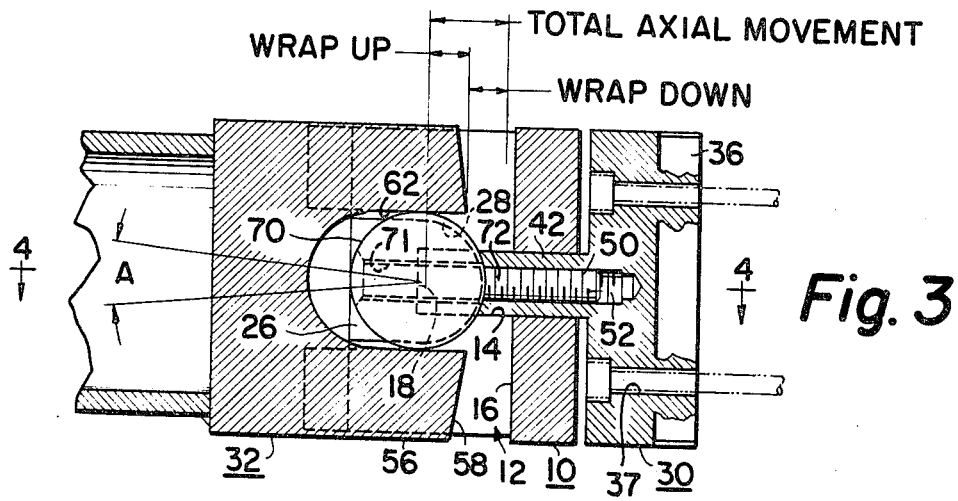
FIGURE 3 is an axial section of the universal joint shown in FIGURE 1.

The ball 70 is also adapted to be received in the cavity 60 formed in the coupling member 32 as is best shown in FIGURE 3. In the assembled condition of the parts, the coupling member 32 will be positioned with the extension 56 received within groove 12 an amount such that more than half of the ball is received within the portion 62 of cavity 60. In other words, the cavity 60 serves as a socket in bearing contact with the exterior of the ball so that the ball serves as a pivot for the coupling member 32. Moreover, it will be apparent that the center of the ball provides the point of articulation of the relative pivotal movement of the coupling members 30 and 32.

Referring to FIGURES 3 and 4, the angles indicated at A and B indicate the deviation possible between the axes of the coupling members 30 and 32 in each of the perpendicular planes through which this deviation can occur. Angle A represents the amount coupling member 32 may pivot relative to intermediate member 10, the center of ball 70 providing the center of this pivotal movement. Angle B represents the amount coupling member 30 may pivot relative to intermediate member 10 with the ball 70 rotating about its center within the cavity 24. The amount of this deviation shown in the drawings is about 10° and is sufficient for an application such as the universal joint of an automobile. However, if desired, the amount of this deviation can be increased for other applications by simple design modifications.

Referring to FIGURE 3 there is indicated the total axial movement which could occur between the coupling members 30 and 32 for the particular application of the invention to an automobile. In FIGURE 3, the coupling member 32 is shown in a medial position which would be the normal condition during operation of the automobile. In accordance with the invention, the universal joint at the front end of the propeller shaft may be connected to the transmission without the provision of the usual spline. Under a "wrap down" condition, such as in the case of an emergency stop, the distance between the transmission and the rear is decreased. Accordingly, the coupling members 30 and 32 move from the full lined position shown in FIGURE 3 closer together through a distance designated as "wrap down." Also, under a "wrap up" condition, such as occurs in acceleration of the automobile, the distance between the transmission and the rear expands. Accordingly, the coupling members will separate an amount designated as the "wrap up" movement in FIGURE 3.

As shown in FIGURE 3, the "wrap down" movement is terminated at a location wherein the end 58 of extension 56 is spaced to the left of the bottom 16 of groove 12 so as to permit the necessary pivotal movement of coupling member 32 about ball 70 without the possibility of contact between end 58 and bottom 16. Also, it will be noted that the "wrap up" movement is terminated at a location wherein the end 58 is to the right of the central plane of the ball 70 so as to maintain engagement at all times between the walls 62 of socket 60 and the ball 70.

There has been described above the relative axial movement possible between coupling members 30 and 32 to accommodate conditions such as "wrap up" and "wrap down" as well as the pivotal movement possible to provide a universal type coupling between the members 30 and 32. In addition, in the operation of the universal joint, as the propeller shaft 34 is rotated, the coupling member 32 is rotated and transmits this movement by way of extension 56 to the intermediate member 10. The intermediate member 10, by reason of its engagement with extension 42, transmits the rotary movement to the coupling member 30 which, in turn, by way of the member 36 transmits rotary movement to the rear of the automobile. As was described above, the universal joint permits a certain amount of deviation between the axes of coupling members 30 and 32. Thus, coupling member 32 can pivot about a center of articulation which is located at the center of the ball 70 (see FIGURE 3), this movement being confined to the plane provided by groove 12. Also, the coupling member 30 may pivot about the same center (see FIGURE 4), this movement being confined to the plane of the groove 14. It will thus be apparent that the coupling members 30 and 32 articulate about the same central point and, since this articulation is in perpendicular planes, a universal type coupling is provided. Also, as was described above, the universal joint permits relative axial movement between the coupling members.

It will be apparent that the broad aspects of the invention have a wide range of utility. Moreover, the mechanism can be constructed easily and inexpensively by reason of the simple construction of the individual parts. Furthermore, it will be obvious that the mechanism is constructed to transmit high loads.

It will be apparent that changes may be made in the construction and arrangement of parts without departing from the scope of the invention. Accordingly, it is not desired to be limited except as set forth by the following claims.

I claim:
1. In a universal joint comprising an intermediate member, a first coupling member in driving engagement with said intermediate member for movement relative thereto in a confined path, a second coupling member in driving engagement with said intermediate member in an opposite portion thereof for movement relative thereto in a confined path perpendicular to the confined path of said first coupling member whereby a universal-type coupling is provided between said first and second coupling members, the improvement comprising means providing grooves in said intermediate member for guiding said first and second coupling members in said confined paths of movement, means for mounting one of said coupling members for axial movement relative to said intermediate member while remaining in driving engagement therewith whereby the universal joint can accommodate relative axial movement of motion transmitting elements secured to said coupling members, and pivot means engaging said first and second coupling members for providing a common, fixed point of articulation thereof.

2. A universal joint according to claim 1 including means for mounting the other of said coupling members to said intermediate member for pivotal movement in said path and to hold the same against axial movement relative to said intermediate member.

3. A universal joint for transmitting rotary movement between a pair of rotatable elements comprising a first coupling member adapted to be connected to one of the rotatable elements for rotation therewith, a second coupling member adapted to be connected to the other of said rotatable elements for rotation therewith, an intermediate member in engagement with said first and second coupling members for transmitting rotary movement therebetween, said intermediate member having a pair of cavities in opposed peripheral portions, the central planes of each of said cavities being perpendicular to one another, said first coupling member being received in one of said cavities of said intermediate member for relative movement therein with respect to said intermediate member along said plane of said cavity and for transmitting rotary movement between said first coupling member and said intermediate member, said second coupling member being received in the other of said cavities of said intermediate member for relative movement therein with respect to said intermediate member along said plane of said cavity and for transmitting rotary movement between said second coupling member and said intermediate member, means providing a pivot for pivotal articulating movement of said first and second members within said cavities receiving the same, means mounting said first member onto said intermediate member, and means for holding said first member against axial movement relative to said intermediate member, said second member cooperating with said pivot means for free axial movement relative to said intermediate member, whereby said universal joint accommodates relative axial movement of said rotatable elements.

4. A universal joint according to claim 3 wherein said pivot means comprises a ball member and a socket cavity in said intermediate member receiving said ball member and containing the same for movement therein.

5. A universal joint according to claim 4 including means connecting said first coupling member to said ball member for conjoint movement therewith.

6. A universal joint according to claim 5 wherein said second coupling member has a socket formed therein and adapted to engage the exterior of said ball member in bearing contact therewith for rotation about the exterior thereof whereby said ball member serves as the pivot of said second coupling member.

7. A universal joint according to claim 6 wherein said socket formed in said second coupling member comprises opposed elongated wall portions in bearing contact with the exterior of said ball member at diametrically opposed locations so that said second coupling member and said ball member may move axially relative to one another.

8. A universal joint according to claim 7 wherein said cavity in said intermediate member receiving said second coupling member is elongated axially to accommodate said relative axial movement.

9. The combination according to claim 5 including spring means in compression between said first coupling member and said intermediate member for biasing said first coupling member away from said intermediate member, said socket cavity in said intermediate member cooperating with said ball member for limiting said biased movement of said first coupling member.

10. A universal joint according to claim 3 wherein said pivot means provides a common point for the pivotal articulating movement of both of said first and second members and includes means for maintaining said common point at a fixed location.

11. A universal joint according to claim 10 wherein said pivot means comprises a ball member mounted on said intermediate member, said common point of pivotal articulating movement being normally located at the center of said ball member.

12. A universal-type coupling for transmitting rotary movement between a pair of rotatable coupling elements comprising a first member in driving engagement with one of the coupling elements for rotation therewith, a second member in driving engagement with other of said coupling elements for rotation therewith, and an intermediate member in engagement with said first and second members for transmitting rotary movement therebetween, said intermediate member having a pair of cavities in opposed peripheral portions, the central planes of each of said cavities being perpendicular to one another, said first member being received in one of said cavities of said intermediate member for relative movement therein with respect to said intermediate member along said plane of said cavity and for transmitting rotary movement between said first member and said intermediate member, said second member being received in the other of said cavities of said intermediate member for relative movement therein with respect to said intermediate member along said plane of said cavity and for transmitting rotary movement between said second member and said intermediate member, a ball member received in a third cavity in said intermediate member, means securing said first member to said ball member for conjoint movement therewith, means on said second member providing a socket having wall means in bearing contact with the exterior of said ball member for guiding said second member for pivotal movement about said ball member whereby said first and second members are pivotally moveable relative to one another with the center of said ball member providing the point of articulation of such pivotal movement, said rotatable movement of said first and second members being confined by said pair of cavities, said wall means of said socket in bearing contact with the exterior of said ball member being elongated axially so that said second member and said ball member may move axially relative to one another, said cavity in said intermediate member receiving said second member being elongated axially to accommodate said relative axial movement.

References Cited

UNITED STATES PATENTS

| | | | |
|---|---|---|---|
| 1,149,306 | 8/1915 | Taylor | 64—16 |
| 1,577,575 | 3/1926 | Geiger | 64—8 X |
| 2,060,209 | 11/1936 | Heckert | 64—31 |
| 2,551,735 | 5/1951 | Goff | 64—9 |
| 2,743,592 | 5/1956 | Nagy | 64—9 |
| 2,964,928 | 12/1960 | Marquis | 64—8 |

HALL C. COE, *Primary Examiner.*

U.S. Cl. X.R.

64—16